Feb. 11, 1969 P. C. NEILSEN 3,426,828
TIRE TREAD CUTTING APPARATUS AND METHOD
Filed April 11, 1966

INVENTOR.
PETER C. NEILSEN
BY Zabel, Baker, York,
Jones & Dithmar
ATTORNEYS

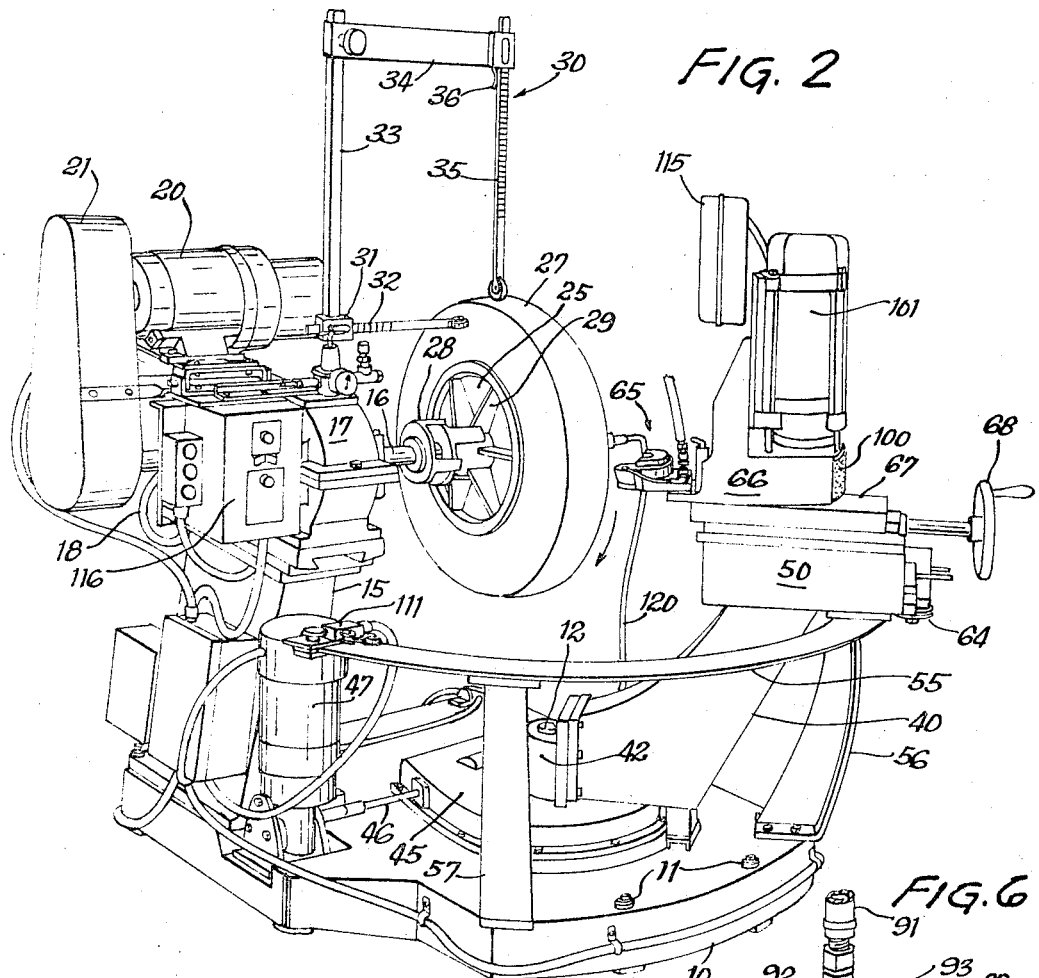
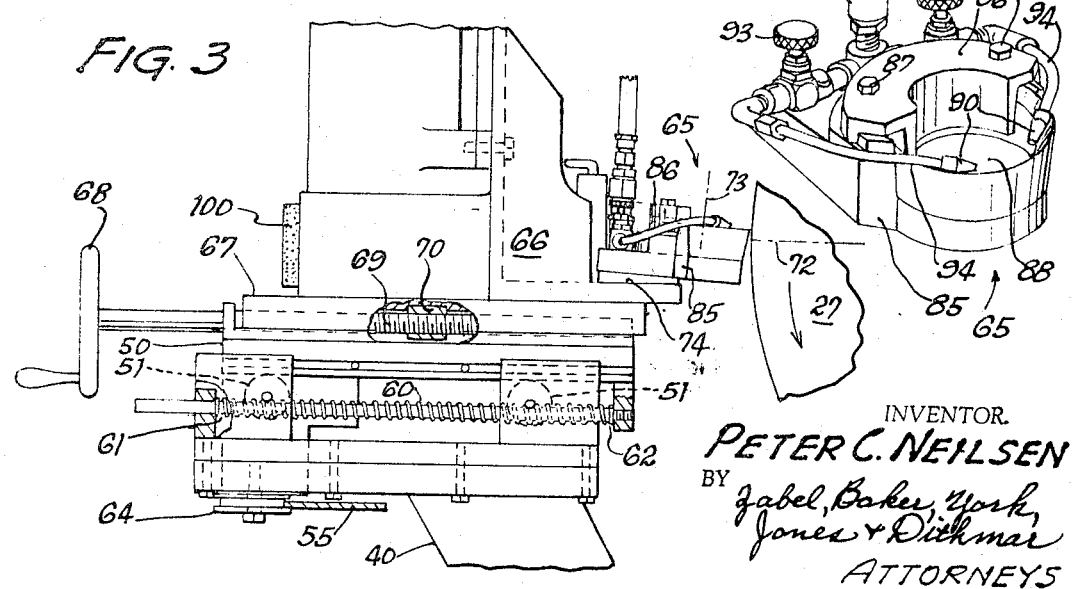

United States Patent Office 3,426,828
Patented Feb. 11, 1969

3,426,828
TIRE TREAD CUTTING APPARATUS AND METHOD
Peter C. Neilsen, Lake Elmo, Minn. 55042
Filed Apr. 11, 1966, Ser. No. 541,609
U.S. Cl. 157—13                    9 Claims
Int. Cl. B29h 19/02, 3/06; B23b 5/36

ABSTRACT OF THE DISCLOSURE

Apparatus and method for removing a portion of the crown of a worn tire preparatory to application of tread stock in the recapping process. An inflated tire is rotated on its axis at predetermined speed, and a knife-type cutter traverses the crown of the tire. The cutter is a frusto-conical tubular member tapering at the larger diameter end from the inside out to form an annular cutting edge, and the portion thereof engaging the tire is spaced a small distance in the direction opposite the direction of tire rotation from the tire diameter parallel to the plane of cutter movement, the axis of the cutter being slightly inclined toward the tire.

---

This invention relates to tire tread cutting apparatus and method, and more particularly to apparatus and method adapted to condition a worn tire for application of tread stock in the recapping process.

My U.S. Patent No. 2,888,065 illustrates a prior machine designed to condition a tire for recapping. This machine, like others previously designed for the same purpose, employs a rotating rasp as the buffing or cutting tool which removes worn rubber from the tire and trues the tire profile both circumferentially and in cross section. The buffing tool used in my patented machine is a rasp of the disc type. Other prior machines employ rasps of the cylindrical or drum type wherein rasping elements, such as tacks, protrude from the surface of a rotating cylinder.

The widely used disc and drum rasps, while effective to remove worn rubber and true the tire, have certain disadvantages. In addition to being comparatively slow in operation, these rasps cut the rubber into small particles, thereby creating a dust-laden atmosphere which imposes personal discomfort and is subject to possible explosion. Accordingly, means must be provided to exhaust the dust-laden air from the vicinity of the machine. Further, the rasping process is disagreeably noisy.

A tire buffed with a rasp, whether the buff be coarse or fine, ordinarily requires the use of a cement to cause proper adhesion between the tire and the applied tread stock. This cement either remains tacky, or tends to become tacky in humid weather. In either case, the adhesion between the tread stock and tire is less than it should be, even after the tread stock is cured. A recapped tire suffering this short-coming constitutes a road hazard. In addition, the solvent component of the cement is explosive, thereby aggravating the exhaust problems confronting a recapper.

Many tires, such as snow tires for passenger cars and large tires used on earth moving vehicles and the like, have pronounced lugs for traction purposes. Tires of this type generally are unsuited to efficient buffing by a rasp.

Rasps tend to develop high temperatures on the tire surface, causing the rubber or other tire material to become glazed in part. A glazed surface results in poor adhesion of the tread stock.

Some tires have metal wires of short length in the tread material for increased durability. Such wires quickly dull the small cutting elements of a rasp and cause increased objectionable heating.

One object of this invention is to provide an apparatus and method for conditioning tires preparatory to recapping which minimizes or eliminates the shortcomings heretofore experienced with prior apparatus and methods which buff with rasps. The cutting element employed in the invention is a nonrotatable knife which engages a rotating tire and cuts away the worn and devitalized rubber or other material in the form of one or more strips. The process is free of dust, comparatively quiet and extremely fast. A passenger tire, for example, can be conditioned for recapping in a matter of two or three minutes.

The surface of a tire conditioned by the present apparatus and method is comparatively smooth, as distinguished from the rough texture applied by a rasp, and it has been found that tread stock adheres to this smooth surface without the need for cement. In fact, the adhesion obtained with a smooth surface generally is superior to that obtained with a rasped surface and cement.

The knife used in the invention does not become heated unduly when cutting the material of the tire. Therefore, there is no problem of glaze such as occurs in the buffing process and reduces adhesion between tire and retread stock.

Another object is to provide cutting apparatus suitable for tires of all sizes and shapes falling within the geometrical limitations of the apparatus. For convenience, the apparatus desirably should be constructed in two sizes, a small size for passenger and smaller truck tires and a large, heavy duty size for the tires used on larger trucks, aircraft and earth moving vehicles.

Still another object is to provide improved apparatus which substantially is automatic in operation. The apparatus thus can be operated successfully by unskilled or semi-skilled personnel, thereby avoiding the need for highly skilled and experienced operators.

Other objects, advantages and details of the invention will be apparent as the description proceeds, reference being had to the accompanying drawings wherein one form of the invention is shown. It is to be understood that the description and drawings are illustrative only, and that the scope of the invention is to be measured by the appended claims.

In the drawings:

FIG. 2 is a perspective view from another direction.

FIG. 3 is an enlarged fragmentary elevational view, partly in section, showing certain details of the invention.

FIG. 6 is an enlarged perspective view showing details of the cutter and associated mounting structure, including nozzles for directing air streams toward the cutting edge.

Figure 1:
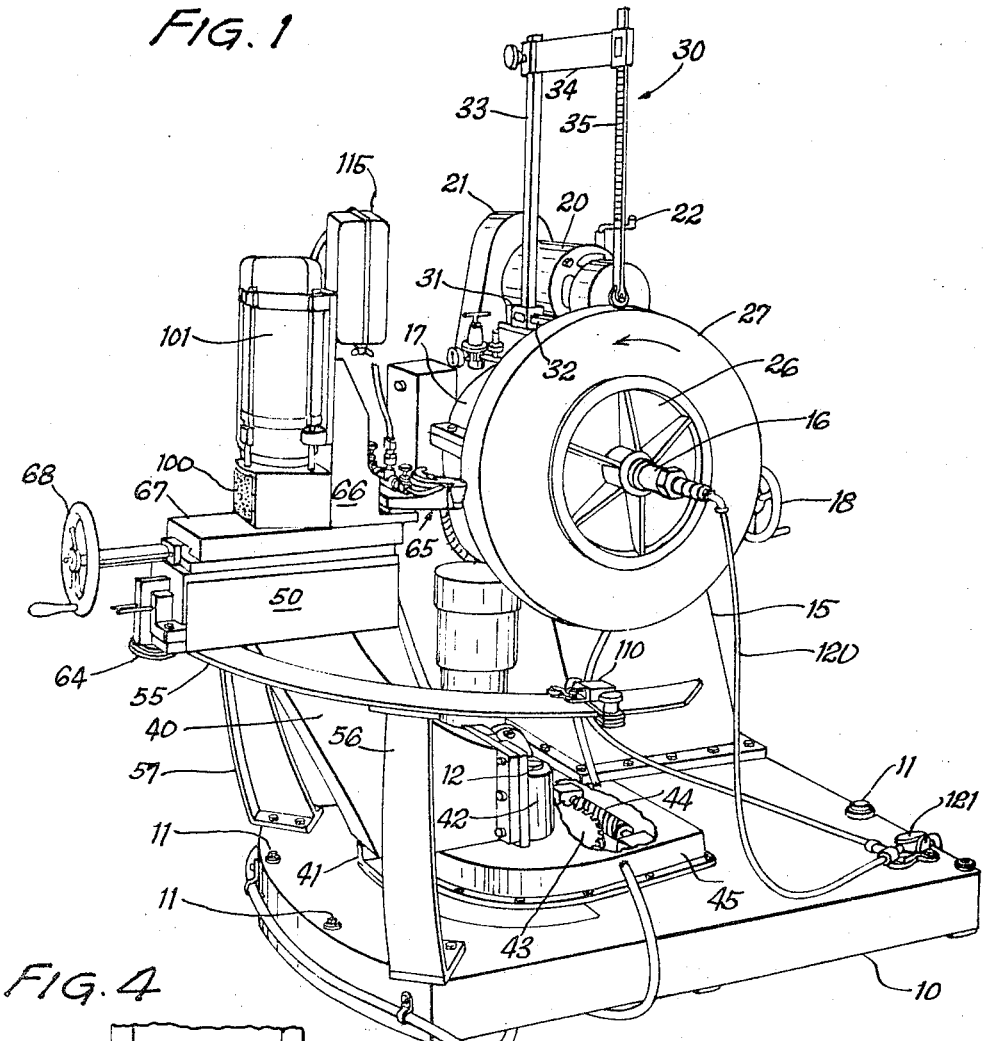
FIG. 1 is a perspective view of tire tread cutting apparatus embodying the invention.

Referring to the drawings, and particularly to FIGS. 1 and 2, the illustrated tire tread cutting apparatus includes a rigid base 10 suitably secured to a floor or other foundation by means such as bolts 11. A pivot pin 12 is mounted more or less centrally on base 10. Pin 12, for example, may be press-fitted and welded in an opening in a thick plate (not shown), the plate being bolted to base 10.

A tire supporting post 15 is mounted on base 10 in spaced relation with pivot pin 12. Post 15 has a transverse horizontal axle 16 extending generally above pivot pin 12. Axle 16 extends from a carriage 17 which is movable on post 15 longitudinally of base 10 by screw means (not shown) responsive to adjusting wheel 18. Thus, actuation of wheel 18 causes axle 16 to move forwardly and rearwardly with respect to pivot pin 12.

An electric motor 20 is mounted on carriage 17, as are a cooperating pulley and belt assembly enclosed in housing 21 and an associated system of reduction gears (not shown). In the form of apparatus shown, the speed of axle 16 is adjusted by crank 22 (FIG. 1) which varies the effective diameter of one of the pulleys within housing 21.

Inner and outer hubs 25 (FIG. 2) and 26 (FIG. 1) are journalled on axle 16, these hubs constituting means for mounting a tire 27 on axle 16 above pivot pin 12. Suitable washers (not shown) or the like are used to position hubs 25 and 26 longitudinally on axle 16 so that the peripheral center line of the tire lies in a vertical plane containing the axis of pivot pin 12. As shown in FIG. 2, a clutch member 28, keyed to axle 16, has protruding fingers which extend between reinforcing radial ribs 29 on hub 25, thereby driving both hubs and tire 27 as axle 16 rotates. As mentioned, motor 20, the belt and pulleys within housing 21 and the reduction gearing system are effective to rotate tire 27 at constant, yet adjustable, speed.

A system of gages, generally designated 30, is mounted on carriage 17 in a vertical plane containing the axis of axle 16. System 30 includes a gage block 31 mounted on carriage 17 and a calibrated adjustable gage arm 32 extending horizontally from the block into engagement with the adjacent side wall of tire 27. The reading of gage arm 32 when engaging tire 27 indexes the diameter of the tire in cross section.

A vertical bar 33 extends upwardly from gage block 31, and at its upper end carries a horizontal arm 34 lying in the plane of gage arm 32 and axle 16. A calibrated gage arm 35, slidably carried at the free end of arm 34, extends downwardly into engagement with the peripheral center line of tire 27. A spring 36 (FIG. 2) establishes a frictional relation between the arms 34 and 35. The reading on gage arm 35 when the free end thereof engages tire 27 indexes the outer diameter of the tire. The readings on gage arms 32 and 35, of course, aid in setting the apparatus for operation on a particular tire, and in establishing the amount of material to be cut away.

A cutter supporting arm 40 is mounted on pivot pin 12, the arm 40 having a portion 41 remote from the pin bearing on base 10 in slidable manner. As best shown in FIG. 1, arm 40 has a cylindrical bearing 42 journalled on pivot pin 12. The lower end of this bearing is secured to a gear 43 which is rotated back and forth by a worm gear 44. The gears 43 and 44 are enclosed by a suitable housing 45 which in FIG. 1 is broken away to show the gears.

As best shown in FIG. 2, worm gear 44 is driven by the shaft 46 which extends laterally from reversible electric motor 47 mounted on base 10 adjacent tire supporting post 15. This motor and aforesaid gears are adapted to rotate cutter supporting arm 40 on the axis of pivot pin 12 back and forth through maximum angles of about 60 degrees on each side of the tire plane. Motor 47 is of the adjustable speed type so that the otherwise constant rotational speed of arm 40 is subject to adjustment.

A cutter carriage 50 is mounted movably on cutter supporting arm 40 at a position remote from the axis of pivot pin 12, the direction of carriage movement being radially of this axis. Carriage 50, as shown in FIGS. 3 and 4, rides on rollers 51 mounted on arm 40.

One of several interchangeable arcuate cams 55 for tires of different cross sectional shapes is disposed in a horizontal plane above base 10 and engaged by cutter carriage 50. As shown, spaced posts 56 and 57 on base 10 support and retain cam 55 in detachable manner. Spring means 60 (FIGS. 3 and 4) extending under compression between cutter support arm 40 at 61 and cutter carriage 50 at 62 biases cutter carriage 50 against cam 55 so that a cutter, presently to be mentioned, maintains fixed relation with the outer cam edge as the arm and carriage rotate back and forth on the axis of pivot pin 12. As shown, an idler wheel 64 on cutter carriage 50 engages cam 55.

Figure 4:
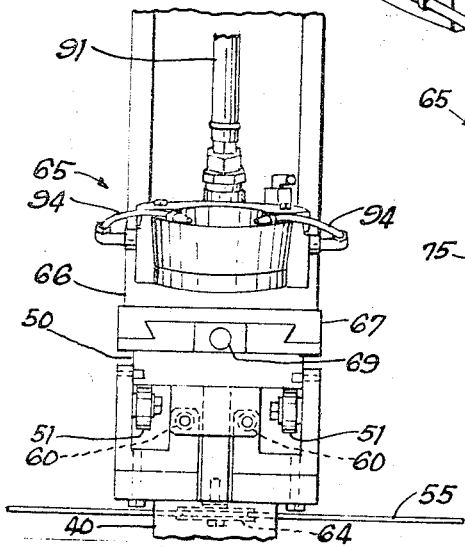
FIG. 4 is a fragmentary front elevational view of the portion shown in FIG. 3.

A cutter, generally designated 65, is mounted on cutter carriage 50, as best shown in FIGS. 3 and 4. The details of cutter 65 will be described later.

Cutter 65 is mounted on irregular rotatable member 66 which in turn is mounted on a plate 67 having sliding relation with cutter carriage 50. As best shown in FIG. 3, adjusting wheel 68 rotates a screw 69 journalled in carriage 50, the screw threaded through a nut 70 carried by sliding plate 67. Thus, plate 67 travels back and forth in response to adjustment of wheel 68, varying the radial position of cutter 65 in relation to a tire 27.

As best shown in FIG. 3, cutter 65 is mounted on rotatable member 66 at an elevation such that the cutting edge of the cutter engages a tire 27 slightly above (about ⅜ inch) a horizontal line 72 through the tire axis. Also, the cutter is inclined slightly toward the tire, the inclination between cutter axis 73 and the vertical being of the order of 4 degrees. A wedge member 74 imparts this inclination in the illustrated form.

Figure 5:
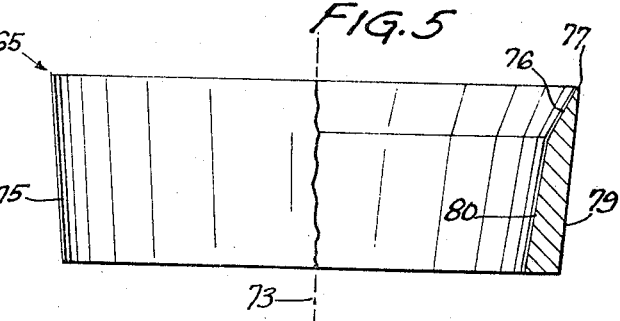
FIG. 5 is an enlarged elevational view, partly in section showing details of the cutter used in the invention.

Referring to FIG. 5, cutter 65 is a frusto-conical tubular member 75 formed of hardened tool stock. Member 75 tapers, as shown at 76, at the larger diameter end from the inside out to form an annular upper cutting edge 77.

By way of specific example found to have superior cutting qualities in the invention, the diameter of annular upper cutting edge 77 is of the order of four inches, while the angles in cross section between cutter axis 73 and exterior surface 79, tapered portion 76 and interior surface 80 are of the order of 5, 30 and 9 degrees, respectively. The axial length of this exemplary cutter is of the order of 1⅜ inches.

The cutting edge is sharpened, that is, tapered portion 76 is ground, after member 75 has been subjected to a hardening or tempering process.

Referring to FIG. 6, cutter 65 is held securely by two castings, namely, a lower casting 85 mounted on rotatable member 66 with wedge member 74 sandwiched between (FIG. 3) and a cooperating upper casting 86. The two castings are held together by bolts 87, cutter 65 being clamped between tapering telescoping walls of the castings.

Only the central portion of the exposed cutting edge 77 of cutter 65 engages a tire during a cutting operation. When this central portion becomes dulled in time, bolts 87 are released slightly so cutter 65 may be rotated through a small angle to present a new and sharp cutting edge portion to the tire.

Lower casting 85 has an opening 88 aligned with the axial opening of cutter 65. The apertured portion of casting 85 extends beyond the adjacent ends of rotatable member 66 and sliding plate 67, as shown in FIG. 3, whereby there is no obstruction below most of opening 88 in the casting. With this arrangement, strip material cut from a tire by cutter 65 passes through the aligned openings in cutter and casting and drops to the base of the apparatus or into a receptacle (not shown).

Some tires, as previously mentioned, have short lengths of wire embedded throughout the tread region for improved durability. These wires, while not particularly objectionable from the standpoint of dulling the cutter, do have a tendency to pile up at the cutting edge, thereby interfering with normal cutting action. In the form of the invention shown, these wires are removed from the region of engagement between cutter and tire by means of one or more air streams directed at the cutting edge from one or more nozzles 90. Two such nozzles 90 are illustrated in FIG. 6. As shown, pressurized air is fed to nozzles 90 through a flexible tube 91 connected to stem 92 of T fitting, the arms of which lead to nozzles 90 through individual valves 93 and tubes 94. Any tendency of the embedded wires to cause elevated temperature also is resisted by the air streams.

Rotatable member 66 which carries cutter 65 and the associated clamping castings and wedge member also carries another tool in the illustrated apparatus. Thus, cutter 65 may be moved into inoperative position in favor of the other tool by suitably positioning rotatable member 66.

The additional tool mounted on rotatable member 66 is a drum-type buffing rasp 100, best shown in FIG. 3. Rasp 100 is oriented on member 66 in 180 degree relation with cutter 65. The rasp is driven by an associated electric motor 101. Rasp 100 is used in those instances wherein a tire has one or more bad cuts or bruises which require localized treatment. A cut or bruised region is buffed with rasp 100 preparatory to treating the fault area with a filler material, as well known in the art.

Reversible electric motor 47 which rotates cutter arm 40 back and forth on the axis of pivot pin 12 is controlled in part by limit switches 110 (FIG. 1) and 111 (FIG. 2) detachably mounted in the positions desired on the end regions of cam 55. These switches, of course, limit the angular travel of cutter 65 around the cross section of tire 27, and are positioned according to the range of travel required by a given tire.

The circuitry for the several motors is conventional, including on-off switches mounted in control boxes 115 and 116.

A tire 27 is inflated and maintained under suitable pressure by pressurized air directed to the tire through axle 16, an air hose 120 (FIG. 1) being detachably connected to a rotatable fitting at the free end of the axle. A foot actuated air valve 121 is provided for convenience.

As previously mentioned, cutter 65 engages tire 27 in the illustrated form of the invention at a point slightly above a horizontal line through the tire axis. It is recognized, of course, that the apparatus may be so constructed that a horizontal line through the tire axis is not the necessary point of reference for cutter 65, and that, therefore, a more generalized description of this feature is in order.

Accordingly, and more generally, cutter 65 is positioned or supported by cutter carriage 50 whereby the cutting edge portion which engages tire 27 is spaced a small distance, e.g. 3/8 inch, in the direction opposite the direction of tire rotation from the tire diameter or line through the tire axis which is parallel to the plane of cutter movement as the cutter travels around the crown of the tire. Further, as mentioned, cutter 65 is so mounted that its axis inclines slightly toward the tire, that is, the axis has an angle of about 4 degrees with a line normal to the aforesaid tire diameter or line through the tire axis.

The method of the invention contemplates, first, the step of rotating an inflated tire on its axis at a peripheral speed of at least 30 inches per second. Cutting action of the described tubular cutter is somewhat impaired at lower peripheral speeds. On the other hand, satisfactory cutting occurs at peripheral speeds up to at least 150 inches per second.

The second step in the method involves engaging the tire in cutting manner with a portion of the annular cutting edge on one end of a stationary tubular cutter which has a cutting edge diameter of the order of 4 inches. Cutters having diameters of 2 inches and 6 inches have been used in the apparatus, and they have been found to produce substantially less satisfactory results than cutters falling in the 3 to 5 inch range. The 4 inch cutter has been found to give optimum results in terms of speed and smoothness of conditioned surface. Also, the circumferential size of the 4 inch cutter is large enough to provide long cutter life before resharpening or replacement is required. It will be recalled that only a comparatively small peripheral portion of the cutter engages the tire in a cutting operation. When that portion becomes dulled through extended use, the cutter is rotated through a small angle to present a new edge to the work.

A further step in the method contemplates moving the cutting edge portion of the cutter in cutting manner transversely around the crown of the tire at a uniform speed of about 3-4 inches per minute. This travel speed is more critical in the method than the peripheral speed of the tire. If the traverse speed is appreciably slower, the tire and cutter tend to increase in temperature with the possibility of forming an objectionable glaze on the conditioned tire surface. At higher traverse speeds, the cutting tends to be incomplete and the tire surface unduly grooved.

The method also contemplates the additional step of directing at least one jet of pressurized air at the point of engagement between cutter 65 and tire 27. The air stream is effective to carry away from the cutting zone abrasive materials, such as embedded wires, which are removed from the tire crown. Absent the air stream, these materials tend to pile up at the cutter edge and impair cutting action.

In the case of tires having a plurality of spaced lugs, as tires used with earth moving equipment and the like, cutter 65 is so set in relation to the tire surface that cutting occurs radially inwardly of the lugs. Thus, the tire material is cut away smoothly and in a continuous strip, thereby avoiding the intermittent cutting action and thumping noise associated with prior apparatus and methods used in conditioning this type of tire for recapping.

As previously mentioned, material in all cases is cut from the tire in continuous strip form, the strip feeding through the axial opening in the tubular cutter and collected in a suitable receptacle or in a neat pile on the base of the apparatus. Virtually no cutting dust is created, thereby eliminating the serious exhaust problem created by apparatus and methods using buffing rasps.

From the above description it is thought that the construction, method steps and advantages of the invention will be readily apparent to those skilled in the art. Various changes in detail may be made without departing from the spirit or losing the advantages of the invention.

Having thus described the invention, what I claim as new and desire to secure by Letters Patent is:

1. Tire tread cutting apparatus comprising:
   means supporting and rotating an inflated tire at predetermined speed;
   a knife-type cutter in cutting relation with the tire, said cutter a frusto-conical tubular member tapering at the larger diameter end from the inside out to form an annular cutting edge;
   means moving said cutter to traverse the crown of the tire, the cutting edge portion of said cutter engaging the tire being spaced a small distance in the direction opposite the direction of tire rotation from the tire diameter parallel to the plane of cutter movement;
   strip material cut from the tire passing through the axial opening in the cutter.

2. The combination of claim 1 wherein the diameter of the annular cutting edge of said cutter is of the order of four inches and wherein the angles in cross section between the cutter axis and the exterior surface, the tapered portion and the interior surface are of the order of five, thirty and nine degrees, respectively.

3. The combination of claim 1 wherein the axis of said cutter is slightly inclined toward the tire.

4. The combination of claim 1 with the addition of means whereby said tubular member may be rotated from time to time to present a new cutting edge portion to the tire.

5. The combination of claim 1 with the addition of means providing at least one air jet directed at the point of engagement between said cutter and a tire to carry away from the cutting zone abrasive materials cut from the tire.

6. The combination of claim 1 wherein the axis of said cutter is inclined toward the tire in such amount that the angle between the axis and a line normal to the tire diameter parallel to the plane of cutter movement is about four degrees.

7. The method of conditioning a tire preparatory to recapping comprising the steps of:
   rotating an inflated tire on its axis at a peripheral speed of at least 30 inches per second,
   engaging the tire in cutting manner with a portion of the annular cutting edge on one end of a stationary tubular cutter having a cutting edge diameter of the order of four inches, and moving the cutting edge portion in cutting manner transversely around the crown of the tire at a uniform speed of about 3–4 inches per minute, whereby material is cut from the tire in continuous strip form, leaving a substantially smooth surface providing superior adhesion of tread stock.

8. The method of claim 7 with the additional step of directing at least one jet of pressurized air at the point of engagement between cutter and tire to carry away from the cutting zone abrasive materials cut from the tire.

9. The method of claim 7 wherein the tire has a plurality of spaced lugs and the cutter so engages the tire that cutting occurs radially inwardly of the lugs.

References Cited

UNITED STATES PATENTS

| | | | |
|---|---|---|---|
| 2,965,162 | 12/1960 | Hawkinson | 157—13 |
| 2,995,183 | 8/1961 | Love | 157—13 |

GRANVILLE Y. CUSTER, JR., *Primary Examiner.*